United States Patent [19]
Revenu

[11] Patent Number: 5,975,381
[45] Date of Patent: Nov. 2, 1999

[54] DISPENSING CAP EQUIPPED WITH A STOPPER, AND METHOD OF MANUFACTURING THIS CAP

[75] Inventor: Christian Revenu, Livry Gargan, France

[73] Assignee: L'Oreal, Paris, France

[21] Appl. No.: 09/051,491

[22] PCT Filed: Aug. 5, 1997

[86] PCT No.: PCT/FR97/01451

§ 371 Date: Sep. 21, 1998

§ 102(e) Date: Sep. 21, 1998

[87] PCT Pub. No.: WO98/07632

PCT Pub. Date: Feb. 26, 1998

[30] Foreign Application Priority Data

Aug. 22, 1996 [FR] France ................................ 96 10375

[51] Int. Cl.⁶ ............................... B65D 51/00; B29B 7/00
[52] U.S. Cl. ..................... 222/563; 222/562; 215/307; 220/254; 220/792; 264/328.7
[58] Field of Search .................................. 222/562, 563; 220/254, 792; 215/307, 320, 354; 264/328.7, 328.2, 328.16; 239/602, DIG. 19

[56] References Cited

U.S. PATENT DOCUMENTS 5,271,513  12/1993  Crosnier et al. ........................ 215/320
5,439,124  8/1995   Mock .................................... 222/562 X
5,596,814  1/1997   Zingle et al. ....................... 215/307 X
5,705,112  1/1998   Gram ...................................... 264/242

OTHER PUBLICATIONS

English language abstract for DE 1941479, Feb. 19, 1970.
English language abstract for DE 3114827, Nov. 4, 1982.
English language abstract for CH 659990, Mar. 13, 1987.
English language abstract for DE 3039796, May 6, 1982.

Primary Examiner—Andres Kashnikow
Assistant Examiner—Sean P. O'Hanlon
Attorney, Agent, or Firm—Oblon, Spivak, McClelland, Maier & Neustadt, P.C.

[57] ABSTRACT

A thermoformed dispensing cap with a stopper which is fitted on a container. The cap includes an elongated dispensing nozzle having a free end which is pierced at its center with an orifice for dispensing a product in the container. A stopper closes the nozzle and is formed of a thermoplastic material different from that which forms the cap. The stopper has a cylindrical portion surmounted by an approximately frustroconical portion. This portion has an outer surface which is an identical replica of the outer surface of the frustroconical portion formed by the free end of the nozzle.

20 Claims, 4 Drawing Sheets

DISPENSING CAP EQUIPPED WITH A STOPPER, AND METHOD OF MANUFACTURING THIS CAP

BACKGROUND OF THE INVENTION

Field of the Invention

The present invention relates to an injection-moulded dispensing cap comprising a dispensing nozzle equipped with a removable stopper. This cap is intended to be fitted to a container containing the liquid product. The invention also relates to a method for the simultaneous manufacture of the cap and of the stopper, by dual injection of two different materials. More specifically, this method makes it possible, in a single mould, to obtain the cap comprising the stopper fitted onto the nozzle.

The cap of the invention is intended, in particular, to be fitted to a container such as a bottle with a neck, with fairly compressible walls containing, for example, a shampoo, a care cream, a liquid foundation, a hair lotion, or in particular any other cosmetic, pharmaceutical or personal hygiene product. These products are marketed in vast numbers and so the cost of their packaging needs to be as low as possible.

DISCUSSION OF THE BACKGROUND

Currently, bottles fitted with a cap of this kind are obtained, in general, by attaching the cap to the neck of the container, for example after snap-fastening or screwing, once the container has been filled with the liquid to be dispensed. In an additional step, the stopper is fitted over the nozzle of the cap to prevent the liquid from running out during storage or transport.

SUMMARY OF THE INVENTION

A first objective of the present invention is to equip a product bottle with a dispensing cap whose cost of manufacture and of mounting is highly advantageous. In particular, the invention aims to reduce the costs of manufacturing and of packaging a bottle equipped with a dispensing cap with stopper. Thus, the invention proposes a cap equipped with a stopper which can be obtained by injection moulding in a single operation by the technique of dual injection of two different materials into an appropriate mould. The invention in particular has the advantage that the stopper can be overmoulded onto the nozzle of the cap by a simple moulding process, thus avoiding an additional operation of fitting the stopper over the nozzle.

Document WO 91/01 213 discloses a method for manufacturing a tube, this tube having a neck on which there is fitted a closure stopper of approximately cylindrical shape. This method consists in forming, in a four-part mould, first of all the stopper by injection-moulding a first material, then, by a helical movement of a first annular part of the mould, creating a volume intended to form the neck of the tube, then, by moving another part of the mould, of annular shape and surrounding the said first part, creating a complementary volume intended to receive the body of the tube. Into the volumes thus created there is then injected a second material appropriate for forming the body and neck of the tube. The tube fitted with the stopper is then removed from the mould. This method has the drawback of requiring a relatively complicated mould made in four parts, one part of which has to be moved axially and another part of which has to be moved simultaneously in translation and in rotation relative to the two stationary parts, in order to create the volume receiving the neck and body of the tube. Furthermore, this moulding method is limited to the production of parts which are essentially in the shape of right cylinders.

The present invention makes it possible to use a simple mould requiring, for the injecting of the cap according to the invention, only an axial movement of just one part of the mould, thanks to the stopper having an approximately frustoconical shape.

Thus, the present invention relates to a thermoformed dispensing cap that can be fitted to a container full of a liquid product, comprising: an elongate dispensing nozzle, the said nozzle having a free end pierced at its centre with an orifice for dispensing the liquid product; a stopper for removably closing the nozzle, the nozzle being formed of a first thermoplastic material, and the stopper being formed of a second thermoplastic material, the first and second materials being mutually incompatible. According to the invention the stopper has a cylindrical portion surmounted by an approximately frustoconical portion, the said frustoconical portion having an outer surface, the said outer surface being an identical replica of the outer surface of a frustoconical portion formed by the said free end of the nozzle.

The term "identical replica" should be understood as meaning the fact that the curve (or profile) formed by the outer surface of the frustoconical part of the stopper results from a point by point translation of the curve formed by the outer surface of the frustoconical part of the nozzle.

According to a preferred embodiment of the invention, the cylindrical portion of the stopper is separated from the frustoconical portion by a shoulder, the said shoulder having a radial width such that when the stopper is placed over the nozzle, the outer surface of the said cylindrical portion of the stopper comes approximately in line with the outer surface of the nozzle.

Advantageously, the nozzle has a product-dispensing duct passing through it. Thus, the frustoconical shape of the nozzle allows precise application of the product at the desired point. Advantageously, the shape of the cone is chosen to be such that an angle of from 5° to 45° is formed between the directrix and the generatrix of the said cone.

This cap may additionally comprise first attaching means borne by the approximately frustoconical portion of the nozzle and second attaching means borne by the inner surface of the stopper, the first means complementing the second. These means allow the stopper to be attached to the said nozzle in a sealed way when the cap is restoppered.

Advantageously, the first attaching means intended for attaching the stopper over the nozzle, consist of an annular rib on the nozzle, the second attaching means then consisting of an annular groove on the inner surface of the stopper. In this case, the stopper, on its external frustoconical surface, has a rib, also of the same shape as the rib on the nozzle.

Advantageously, the dispensing orifice lies at the bottom of a depression formed at the centre of the said free end, the stopper having a pip whose shape is such that when the cap is closed over the nozzle, the pip fills approximately the entire depression, thus sealing the said orifice.

The cap may further comprise means for connecting it to the reservoir. When use is made, for example, of a bottle with a threaded neck, these means consist of a screw-on ring with a screw thread that complements the screw thread of the neck, this ring being provided on an end of the cap which is the opposite end to the nozzle.

Within the meaning of the present intention, the term "incompatible materials" is understood as meaning two materials which cannot form a mechanical bond between them, by melting. This characteristic can be achieved by a suitable choice of the said materials.

It is clearly understood that depending on the nature of the said materials chosen, a certain sticking of the stopper to the nozzle may occur, it being possible for this sticking to be broken by the user by slightly twisting the stopper relative to the nozzle. Thus it is advantageous to choose first and second materials such that the melting point of the first material is higher than the melting point of the second material, for example by about 20° C. to 70° C.

In general, the first material is a relatively rigid material chosen from polypropylenes or high-density polyethylenes, while the second material is a semi-rigid to flexible material, chosen from low-density polyethylenes and elastomers.

A non-limiting example of first and second materials that can be used according to the invention is: polypropylenes (melting point about 170° C.) and polyethylenes (melting point about 120° C.), or polypropylenes and polyurethane elastomers.

A second aspect of the invention is a method of manufacturing a dispensing cap as described earlier. The cap has a longitudinal axis and comprises a dispensing nozzle closed by a stopper.

This method consists in carrying out the following steps in turn:

a) injecting a first thermoplastic material which has a melting point into a first space delimited by a mould comprising a first central part, a second central part which can be moved axially, and a lateral part surrounding the said first and second central parts, so as to form the nozzle, the said second central part having an approximately frustoconical surface facing the first central part;

b) axially moving the second central part away from the first, so as to delimit a second space for moulding the stopper;

c) injecting into the second space a second thermoplastic material which is not compatible with the first material, so as to form the said stopper, the said second material being injected at a temperature which is below the melting point of the first material; and d) after cooling, removing the cap from the mould.

Advantageously, the second material has a melting point at least 20° C. below the melting point of the first material. According to an attractive aspect of the invention, in particular, the temperature at which the second material is injected is at least 20° below the melting point of the first material.

The stopper produced in this way has at its base a cylindrical part, the height of which corresponds to the translation of the external part of the mould. Furthermore, the internal surface of the stopper perfectly complements the external surface of the nozzle.

According to this method, the first injection temperature is advantageously at least equal to the second injection temperature. In particular, when the cap is being injected in polypropylene and the stopper in polyethylene, the injection temperatures are, for example, 190° C. and 220° C. respectively. In general, the temperature at which these materials are injected is higher than the respective melting point.

Finally, a third subject of the invention relates to a container containing a liquid to be dispensed and fitted with a dispensing cap like the one defined hereinabove and produced by the above method. This container may be in the form of a bottle made of rigid or flexible plastic, or alternatively of glass, with a cylindrical or oval cross-section, in the form of a tube or tube-bottle. In general, any kind of container that can be used in the fields of cosmetics, pharmacy or personal hygiene may be fitted with the cap of the invention.

BRIEF DESCRIPTION OF THE DRAWINGS

One particular embodiment of the cap of the invention and its method of manufacture will now be described by way of purely illustrative and non-limiting example, with reference to the appended drawings.

DISCUSSION OF THE PREFERRED EMBODIMENTS

Figure 1:
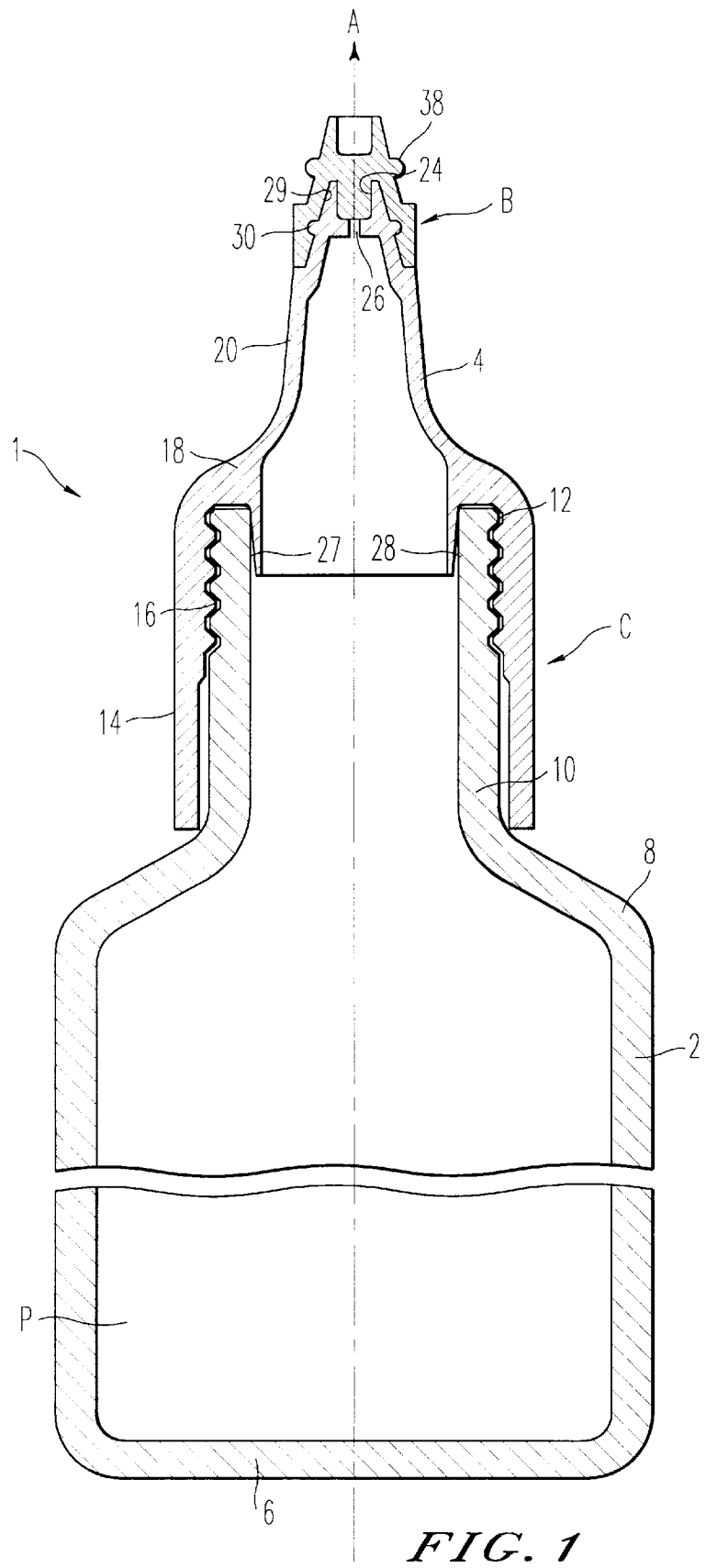
FIG. 1 depicts a view in axial section of a dispenser comprising a bottle and a cap in accordance with the invention, this cap being fitted with a stopper.
Figure 2:
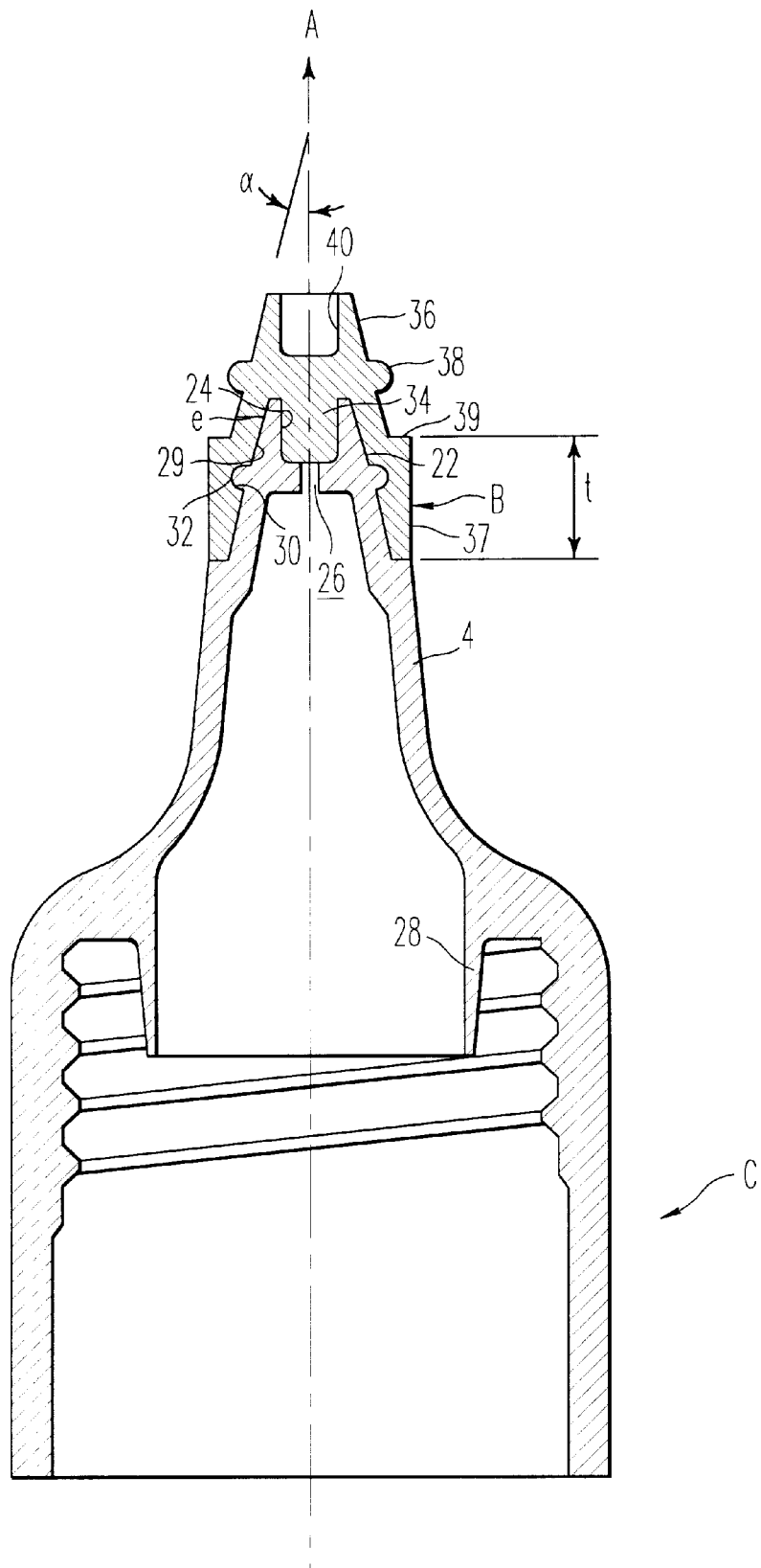
FIG. 2 depicts an enlarged axial section through the cap and through the stopper of FIG. 1.

By referring to FIGS. 1 and 2, it is possible to see depicted a dispenser 1 which has a longitudinal axis A, consisting of a container 2 in the form of a bottle, filled with a liquid product P and surmounted by a dispensing cap C in accordance with the invention. The cap C has a dispensing nozzle 4 through which there passes a central dispensing passage, itself sealed by a stopper B.

The bottle 2 has a cylindrical shape and has a closed bottom 6. At the opposite end to the bottom, the bottle 2 has a shoulder 8. Connected to this shoulder 8 is a cylindrical neck 10 provided with an external screw thread 12.

Screwed onto the neck 10 is the cap C. It comprises a screw-on ring 14 surrounding the neck 10 and equipped with an internal thread 16 interacting with the screw thread 12 of the neck. The opposite end to the bottle 2 of this ring 14 has a shoulder 18 which extends in the direction away from the bottle in the form of a tube 20, the diameter of which decreases towards its free end 22. This tube 20 constitutes a nozzle for applying the product P. The free end 22 of the nozzle 20 is shaped externally into a cone frustum, provided with a central bore 24. At the closed end of the central bore 24 there is a dispensing nozzle 26 communicating with the product P. To ensure that the cap seals onto the bottle 2 correctly, this cap has a circular sealing skirt 27 pressing against the interior edge 28 of the neck 10.

The stopper B presses against the conical end of the nozzle 20. The stopper B has an external surface and an internal surface. As visible in FIG. 2, the internal surface 29 of the stopper B is frustoconical, matching the external shape of the cone frustum 22. The cone 22 has an attaching rib 30 located approximately mid-way up the cone, the rib interacting with a complementary annular groove 32 made in the internal surface 29 of the stopper. This rib/groove system constitutes a means of attaching the stopper B to the cap C. As can be seen in FIGS. 1 and 2, at the top of the cone frustum 22 of the nozzle there is a stoppering pip 34 which fits in a sealed manner into the bore 24 of the cap.

According to the invention, the external surface 36 of the stopper B has strictly the same shape as the external surface of the cone frustum 22 of the nozzle 20, that is to say, that this external surface has a cone frustum 36, an external rib 38 and a bore 40.

The rib 38 may serve as something to grasp, making it easier for the stopper to be removed from the nozzle, especially at the first time of use.

Figure 4:
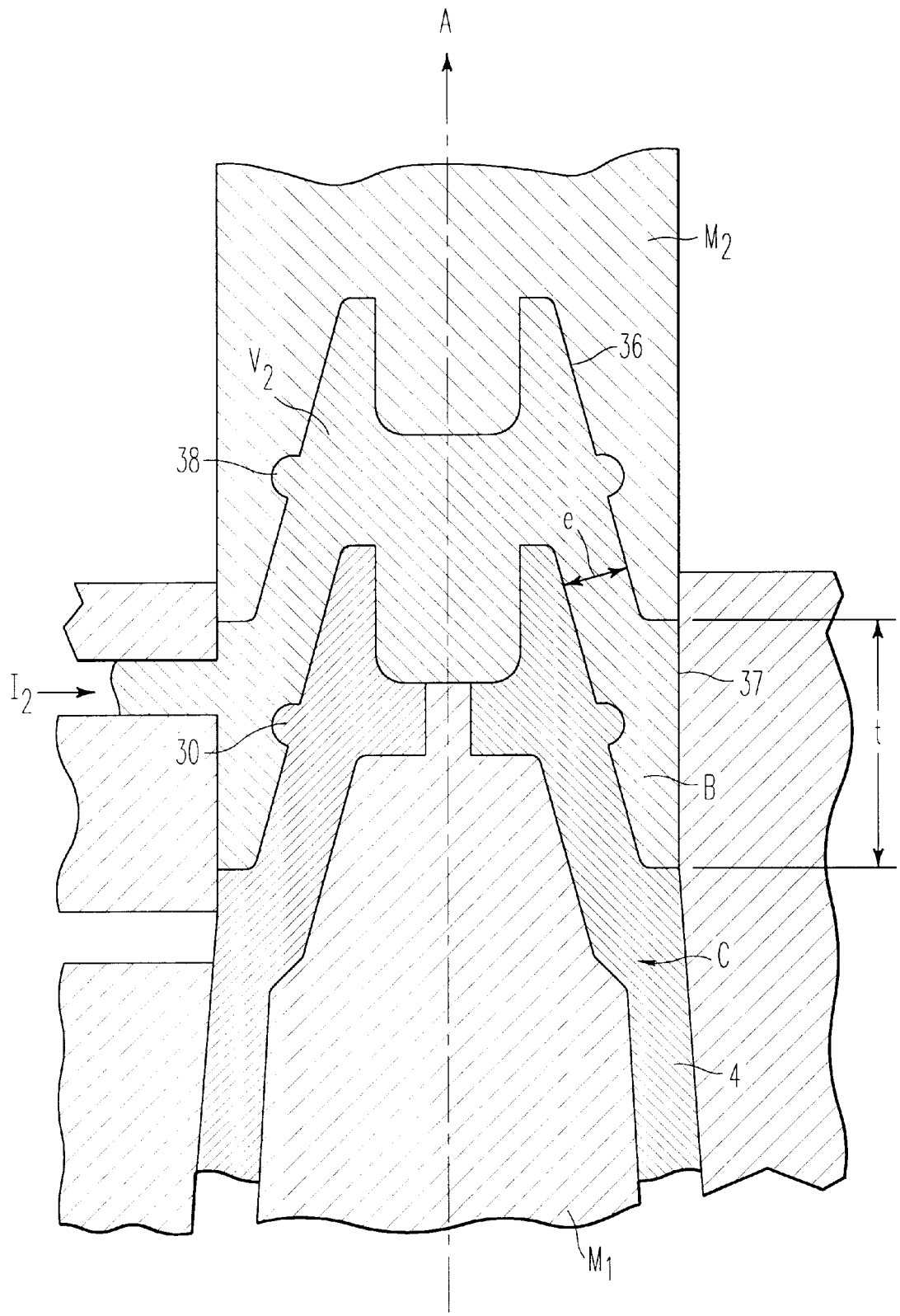
FIG. 4 depicts a diagrammatic view of the mould of FIG. 3, in partial axial section, this mould containing the cap of FIG. 2, the stopper being in the process of being manufactured.

In accordance with the invention, the base of the stopper B consists of a cylindrical part 37 of height t (as indicated in FIGS. 2 and 4). An annular shoulder 39 separates the cylindrical part 37 from the frustoconical part 36.

It should be noted that the external surface of the nozzle 20 and the external surface 36 of the stopper, respectively, are at an angle α to the axis A. The angle α is advantageously between about 5° and 45°. The value of this angle is chosen as a function of the materials used and the quality of stoppering desired.

Advantageously, the cap C is formed of a first relatively rigid thermoplastic material, for example polypropylene. The stopper is preferably formed of a semi-rigid thermoplastic material, for example low-density polyethylene (LDPE) or an elastomeric thermoplastic material. Because it is made of a semi-rigid or elastomeric material, the stopper presses in a sealed fashion against the nozzle 4. In particular, when the stopper B is put back in place by the user on the nozzle 4, the engagement of the rib 30 in the groove 32 allows the cap to be restoppered in a sealed way.

It is obvious that the rib/groove system could be omitted, when a cap for a single-dose product is being produced, where restoppering is not required. In this case, the stopper is held in place on the nozzle by an adhesion which occurs at the time of manufacture of the nozzle with the stopper by dual injection of two appropriate materials, this adhesion being sufficient to keep the cap sealed during transport.

Figure 3:
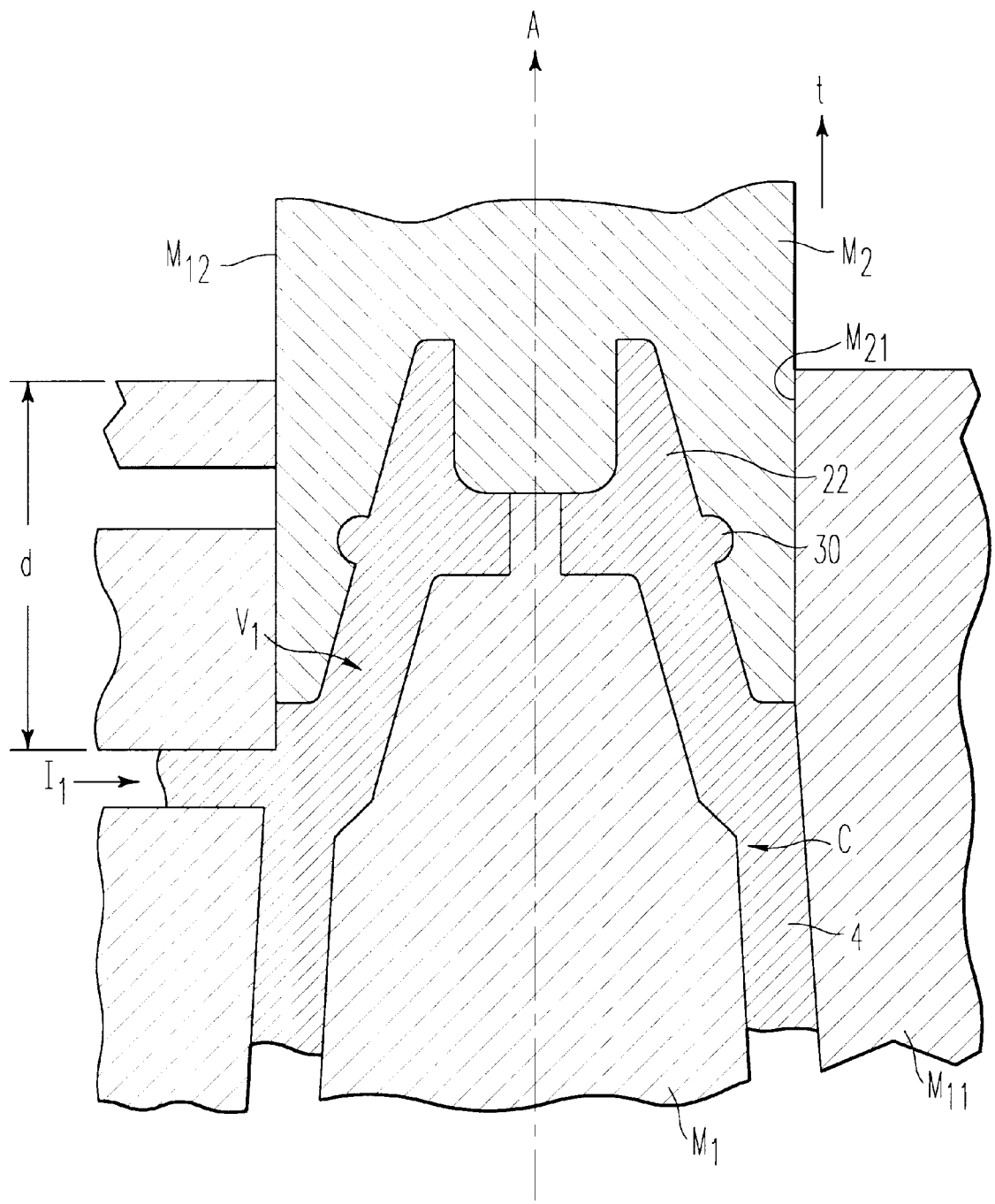
FIG. 3 depicts a diagrammatic view in partial axial section of a mould for the cap of FIG. 2, the cap being in the process of being manufactured in the mould.

The cap C of the invention, fitted with its stopper B, can be obtained by injecting two different thermoplastic materials into one and the same appropriate mould. FIG. 3 shows a partial diagrammatic section through an opening mould in three parts $M_1$ and $M_2$ and $M_{11}$, showing the nozzle 4 of the cap in the process of being produced. The two central parts of the mould $M_1$ and $M_2$ define, with a lateral peripheral part $M_{11}$, a volume $V_1$ corresponding to the shape of the cap. It should be noted that the part $M_2$ of the mould has a cylindrical outer contour $M_{12}$ which fits axially, by a determined distance d into a corresponding hollow cylindrical portion $M_{21}$ of the part $M_{11}$ of the mould. To produce the cap, a first thermoplastic material, here polypropylene, is injected through an injection runner $I_1$ into the volume $V_1$ at a determined temperature $T_1$, for example 220° C.

Once the cap C has been produced, the part $M_2$ of the mould is moved away, along the axis A, from the other two parts $M_1$ and $M_{11}$ of the mould. This translation is depicted in FIG. 4 by the arrow t. The length of the arrow t is less than the distance d. Through this translation t, a volume $V_2$ is created, this volume being defined between the part $M_2$ of the mould and the nozzle 4 of the cap which has just been injection-moulded. Using an injection runner $I_2$, designed for injecting a second material, here low-density polyethylene, this second material is then injected into the volume $V_2$ at a determined temperature $T_2$, for example 190° C. The cylindrical part 37 of the stopper B thus moulded then has a height corresponding to the translation t of the mould $M_2$. Thus, the stopper has a side wall with a thickness e (see FIG. 2) of a value e=t×sin α, α being the angle formed between the directrix and the generatrix of the conical part 22, 36 of the nozzle, or of the stopper, respectively.

In general, it is advantageous to choose first and second materials such that the melting point of the first material is equal to or higher than the melting point of the second material, for example 20° C. higher.

After cooling of the cap C—stopper B assembly, and its removal from the mould, the assembly B+C can be attached, simply by screwing, onto an appropriate bottle 2 previously filled with a liquid product P (see FIG. 1). The dispenser 1 is thus ready to be marketed.

To apply product P to the desired point, the user removes the stopper B from the nozzle 4 in the customary way. This stopper can be pulled off without excessive force: under some conditions, thanks to the choice of moulding conditions and thanks to the choice of first and second materials which have just been described, the stopper does not stick, or sticks very little, to the nozzle, the presence of the rib 38 on the conical surface of the stopper making the stopper easier to grasp. If need be, the user can encourage the stopper to become unstuck by twisting it slightly relative to the nozzle.

The method for the simultaneous manufacture of a cap C and of its stopper B in accordance with the invention is advantageous from the economic point of view, because it requires just one manufacturing mould made in three parts, only one part of which can move with respect to the other two parts. Furthermore, an additional operation of fitting the stopper B onto the nozzle of the cap C is avoided. This results in manufacturing and packing costs which are markedly lower than the corresponding costs for a conventional dispenser.

I claim:

1. Thermoformed dispensing cap that can be fitted to a container full of a product, comprising: an elongate dispensing nozzle, the said nozzle having a free end pierced at its centre with an orifice for dispensing the product; a stopper for removably closing the nozzle, the nozzle being formed of a first thermoplastic material, and the stopper being formed of a second thermoplastic material, the first and second materials being mutually incompatible, characterized in that the stopper has a cylindrical portion surmounted by an approximately frustoconical portion, the said frustoconical portion having an outer surface, the said outer surface being an identical replica of the outer surface of a frustoconical portion formed by the said free end of the nozzle.

2. Cap according to claim 1, characterized in that the cylindrical portion of the stopper is separated from the frustoconical portion by a shoulder, the said shoulder having a radial width such that when the stopper is placed over the nozzle, the outer surface of the said cylindrical portion of the stopper comes approximately in line with the outer surface of the nozzle.

3. Cap according to claim 2, characterized in that it further comprises first attaching means borne by the nozzle and second attaching means borne by the stopper, the first means complementing the second.

4. Cap according to claim 2, characterized in that the dispensing orifice lies at the bottom of a depression formed at the center of the said free end, the stopper having a pip whose shape is such that when the cap is closed over the nozzle, the pip fills approximately the entire depression, thus sealing the said orifice.

5. Cap according to claim 2, characterized in that it further comp rises means for connecting it to the container.

6. Cap according to claim 1, characterized in that it further comprises first attaching means borne by the nozzle and second attaching means borne by the stopper, the first means complementing the second.

7. Cap according to claim 6, characterized in that the first attaching means consist of an annular rib, the second means consisting of an annular groove.

8. Cap according to claim 7, characterized in that the dispensing orifice lies at the bottom of a depression formed at the center of the said free end, the stopper having a pip whose shape is such that when the cap is closed over the nozzle, the pip fills approximately the entire depression, thus sealing the said orifice.

9. Cap according to claim 7, characterized in that it further comp rises means for connecting it to the container.

10. Cap according to claim 6, characterized in that the dispensing orifice lies at the bottom of a depression formed at the center of the said free end, the stopper having a pip whose shape is such that when the cap is closed over the nozzle, the pip fills approximately the entire depression, thus sealing the said orifice.

11. Cap according to claim 6, characterized in that it further comprises means for connecting it to the container.

12. Cap according to claim 1, characterized in that the dispensing orifice lies at the bottom of a depression formed at the centre of the said free end, the stopper having a pip whose shape is such that when the cap is closed over the nozzle, the pip fills approximately the entire depression, thus sealing the said orifice.

13. Cap according to claim 12, characterized in that it further comprises means for connecting it to the container.

14. Cap according to claim 1, characterized in that it further comprises means for connecting it to the container.

15. Cap according to claim 1, characterized in that the melting point of the first thermoplastic material is higher than the melting point of the second thermoplastic material.

16. Cap according to claim 1, characterized in that the difference between the melting point of the first thermoplastic material and the melting point of the second thermoplastic material is at least equal to 20° C.

17. Cap according to claim 1, characterized in that the first and second materials consist of the pairing: polyethylene—polypropylene.

18. Method for moulding a dispensing cap according to any one of the preceding claims, comprising the following steps:

a) injecting a first thermoplastic material which has a melting point into a first space delimited by a mould comprising a first central part, a second central part which can be moved axially, and a lateral part surrounding the said first and second central parts, so as to form the nozzle, the said second central part having an approximately frustoconical surface facing the first central part;

b) axially moving the second central part away from the first, so as to delimit a second space for moulding the stopper;

c) injecting into the second space a second thermoplastic material which is not compatible with the first material, so as to form the said stopper, the said second material being injected at a temperature which is below the temperature; and d) after cooling, removing the cap from the mould.

19. Method according to claim 1, characterized in that the second material has a melting point at least 20° C. below the temperature.

20. Container containing a liquid product P, characterized in that it is fitted with a cap in accordance with claim 1.

* * * * *